US010395104B2

(12) United States Patent
Iizuka

(10) Patent No.: US 10,395,104 B2
(45) Date of Patent: *Aug. 27, 2019

(54) VEHICLE IMAGING SYSTEM, VEHICLE IMAGING METHOD AND DEVICE, PROGRAM, AND RECORDING MEDIUM

(71) Applicant: NEC Corporation, Minato-ku, Tokyo (JP)

(72) Inventor: Yosuke Iizuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/217,129

(22) Filed: Dec. 12, 2018

(65) Prior Publication Data
US 2019/0114475 A1    Apr. 18, 2019

Related U.S. Application Data

(63) Continuation of application No. 14/435,930, filed as application No. PCT/JP2013/078352 on Oct. 18, 2013, now Pat. No. 10,185,871.

(30) Foreign Application Priority Data

Oct. 19, 2012   (JP) .................................. 2012-231675

(51) Int. Cl.
G06K 9/00      (2006.01)
G08G 1/015     (2006.01)
(Continued)

(52) U.S. Cl.
CPC .......... G06K 9/00369 (2013.01); G01B 11/00 (2013.01); G01B 11/026 (2013.01);
(Continued)

(58) Field of Classification Search
CPC ....................... G06K 9/00362; G06K 9/00832
See application file for complete search history.

(56) References Cited

U.S. PATENT DOCUMENTS 5,633,705 A *  5/1997  Asayama ................ G01S 7/497
                                                    356/3.14
2004/0101166 A1   5/2004  Williams et al.
(Continued)

FOREIGN PATENT DOCUMENTS

JP     H08-147592 A    6/1996
JP     2003109178 A    4/2003
(Continued)

OTHER PUBLICATIONS

Japanese Office Action for JP Application No. 2012-231675 dated Jan. 10, 2017 with English Translation.
(Continued)

Primary Examiner — Rowina J Cattungal

(57) ABSTRACT

A system includes a laser displacement sensor which is provided on a shoulder of a roadway, emits a laser beam which scans a roadway space in a height direction thereof, receives a beam reflected by an object which is present in the roadway space, and measures a distance up to a reflection point on the object, at which the laser beam was reflected; and a vehicle window detection device that detects a window of the vehicle based on the distance measured by the laser displacement sensor. The vehicle window detection device detects the window of the vehicle based on a change in a distance in a horizontal direction from the laser displacement sensor to the reflection point after the vehicle in the roadway space was detected.

10 Claims, 4 Drawing Sheets

(51) Int. Cl.
    G08G 1/01     (2006.01)
    G08G 1/017    (2006.01)
    H04N 7/18     (2006.01)
    G01S 17/08    (2006.01)
    G08G 1/04     (2006.01)
    G01B 11/00    (2006.01)
    G01B 11/24    (2006.01)
    G01B 11/02    (2006.01)
(52) U.S. Cl.
    CPC .............. *G01B 11/24* (2013.01); *G01S 17/08* (2013.01); *G06K 9/00825* (2013.01); *G06K 9/00838* (2013.01); *G06K 9/00845* (2013.01); *G08G 1/015* (2013.01); *G08G 1/0116* (2013.01); *G08G 1/0175* (2013.01); *G08G 1/04* (2013.01); *H04N 7/183* (2013.01)

(56)         References Cited

U.S. PATENT DOCUMENTS

| | | | |
|---|---|---|---|
| 2008/0175438 A1* | 7/2008 | Alves | G08G 1/0175 382/105 |
| 2009/0046897 A1 | 2/2009 | Rowsell et al. | |
| 2012/0010804 A1 | 1/2012 | Fliegen | |
| 2015/0348270 A1* | 12/2015 | Branz | G06K 9/00805 701/70 |

FOREIGN PATENT DOCUMENTS

| | | | | |
|---|---|---|---|---|
| JP | 2003203291 A | | 7/2003 | |
| JP | 3740531 B2 | | 1/2004 | |
| JP | 4267469 B2 | | 8/2005 | |
| JP | 2011133989 A | * | 7/2011 | |
| RU | 2009140318 A | | 5/2011 | |
| WO | 2013/043154 A1 | | 3/2013 | |
| WO | WO 2013043154 A1 | * | 3/2013 | ............ G01J 3/0264 |

OTHER PUBLICATIONS

Russian Office Action for RU Application No. 2015117492/11 dated Sep. 2, 2016 with English Translation.
Extended European Search Report for EP Application No. EP13846986.7 dated Jun. 13, 2016.
International Preliminary Report on Patentability of PCT Application No. PCT/JP2013/078352 dated Jan. 30, 2015.
International Search Report for PCT Application No. PCT/JP2013/078352, dated Nov. 12, 2013.

* cited by examiner

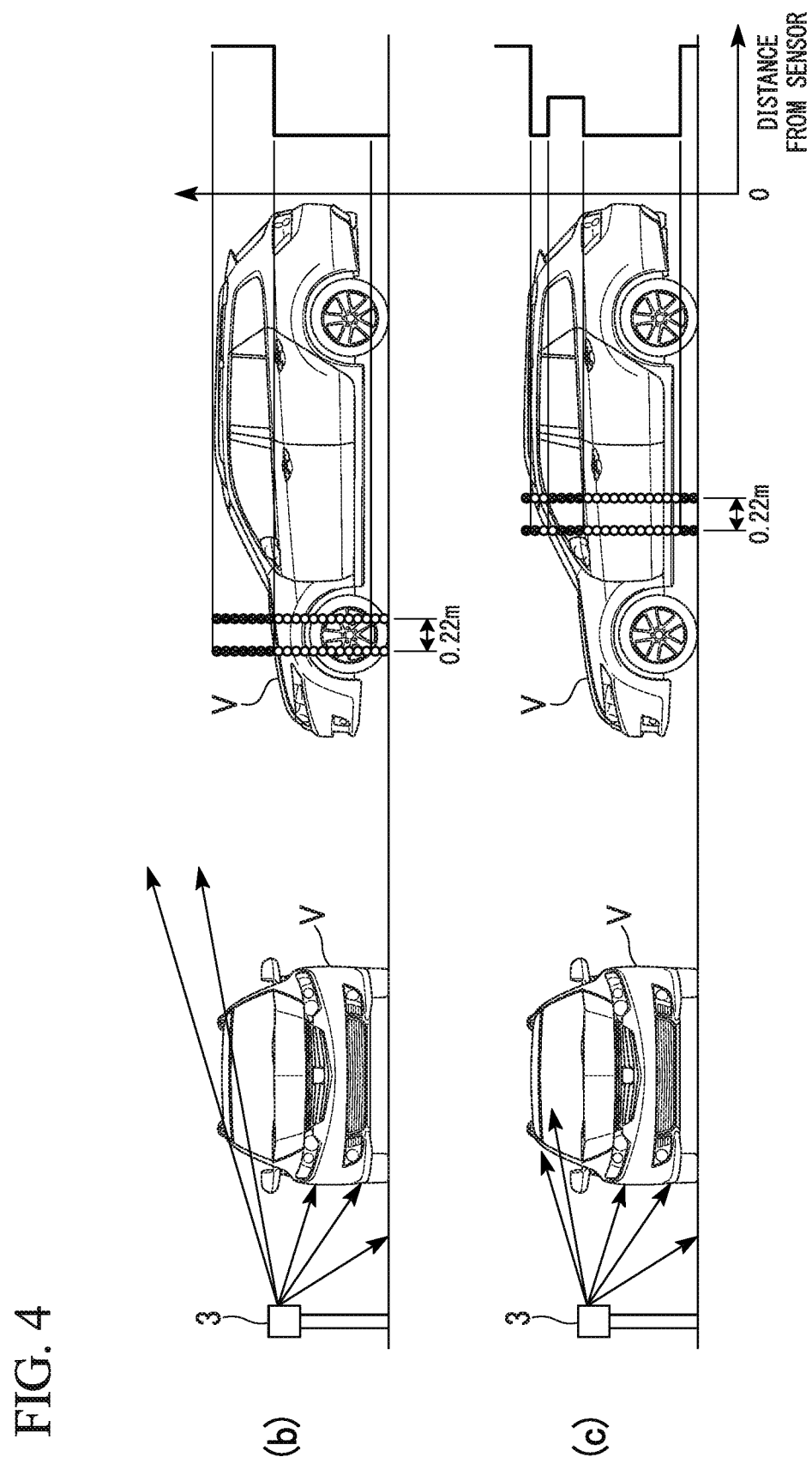

VEHICLE IMAGING SYSTEM, VEHICLE IMAGING METHOD AND DEVICE, PROGRAM, AND RECORDING MEDIUM

REFERENCE TO RELATED APPLICATION

The present application is a continuation application of U.S. patent application Ser. No. 14/435,930 filed on Apr. 15, 2015, which is a National Stage Entry of international application PCT/JP2013/078352 filed on Oct. 18, 2013, which claims the benefit of priority from Japanese Patent Application 2012-231675 filed on Oct. 19, 2012, disclosures of all of which are incorporated herein, in their entirety, by this reference.

TECHNICAL FIELD

The present invention relates to a vehicle imaging system, a vehicle imaging method, a vehicle imaging device, a program, and a recording medium.

BACKGROUND ART

Road traffic detection is performed so that drivers who drive individual vehicles, a manager who manages operation of the vehicles, a traffic manager, and a road manager understand the road traffic situation by means of various sensors and carry out actions so as to maintain a safe, smooth, and comfortable traveling environment.

As a known technique in the relevant technical field, Patent Document 1 discloses a system that efficiently and accurately examines parked vehicles by utilizing a running vehicle for examination. Specifically, in the system, data for a target object on a road, which is imaged by a laser scanner built in a measuring vehicle which is travelling on the road, is received.

The above system has a side data extraction unit which extracts data of a side (surface) of a parked vehicle which is parked on a road, based on the data imaged by the laser scanner, and a parked vehicle presence/absence determination unit that determines the presence or absence of a parked vehicle, based on the extracted side surface data of the parked vehicle.

PRIOR ART DOCUMENT

Patent Document

Patent Document 1: Publication of Japanese Patent No. 3,740,531.

DISCLOSURE OF INVENTION

Problem to be Solved by the Invention

In a traffic management system, the interior of each vehicle may be imaged from the outside of the vehicle for a variety of purposes such as determination of travel regulation or traveling lane compliance with reference to the number of passengers, entry passenger management of entry vehicles, scanning to find a vehicle used in a crime, and determination about compliance status for the legal number of passengers. In the imaging, the status of the passenger seat and the driver's seat can be known by means of imaging through the windshield from the front of the vehicle.

However, when imaging the interior of the vehicle through the windshield from the front of the vehicle, the status of the rear seat may not be accurately known because the rear seat may be hidden by each head of persons who are sitting in the driver's seat and the passenger seat, the headrests of the seats, or the like.

Therefore, it is estimated that the status of the entire interior of the vehicle can be known utilizing a system which images the interior through a window from a side of the vehicle.

However, the position of each window of a vehicle varies depending on the model to which the vehicle belongs. Therefore, to implement such a system, it is required to accurately detect a window of a target vehicle. To meet such a requirement, the technology described in Patent Document 1 can determine the presence or absence of a vehicle, but cannot detect a window of the vehicle.

An object of the present invention is to provide a vehicle imaging system, a vehicle imaging method, a vehicle imaging device, a program, and a recording medium, which solve the above-described problem.

Means for Solving the Problem

In order to solve the above problem, a imaging detection system provided by the present invention has:

a laser displacement sensor which is provided on a shoulder of a roadway, emits a laser beam which scans a roadway space in a height direction thereof, receives a beam reflected by an object which is present in the roadway space, and measures a distance up to a reflection point on the object, at which the laser beam was reflected;

a vehicle window detection device that detects a window of the vehicle based on the distance measured by the laser displacement sensor, and a camera that images the vehicle.

The vehicle imaging device:

detects the window of the vehicle based on a change in a distance in a horizontal direction from the laser displacement sensor to the reflection point after the vehicle in the roadway space was detected; and sends a trigger for imaging to the camera when the window of the vehicle has been detected.

The present invention also provides a vehicle imaging method utilizing a laser displacement sensor which is provided on a shoulder of a roadway, emits a laser beam which scans a roadway space in a height direction thereof, receives a beam reflected by an object which is present in the roadway space, and measures a distance up to a reflection point on the object, at which the laser beam was reflected. The method includes:

detecting a window of a vehicle based on a change in a distance from a position of the laser displacement sensor in a horizontal direction to a position of the reflection point in the horizontal direction, after the vehicle in the roadway space was detected; and sending a trigger for imaging to a camera, that images the vehicle, when the window of the vehicle has been detected.

The present invention also provides a vehicle imaging device that detects a window of a vehicle utilizing a laser displacement sensor which is provided on a shoulder of a roadway, emits a laser beam which scans a roadway space in a height direction thereof, receives a beam reflected by an object which is present in the roadway space, and measures a distance up to a reflection point on the object, at which the laser beam was reflected. The device:

detects the window of the vehicle based on a change in a distance from a position of the laser displacement sensor in a horizontal direction to a position of the reflection point in the horizontal direction, after the vehicle in the roadway space was detected; and sends a trigger for imaging to a camera, that images the vehicle, when the window of the vehicle has been detected.

The present invention also provides a program that makes a computer execute functions of:

detecting a window of a vehicle utilizing a laser displacement sensor which is provided on a shoulder of a roadway, emits a laser beam which scans a roadway space in a height direction thereof, receives a beam reflected by an object which is present in the roadway space, and measures a distance up to a reflection point on the object, at which the laser beam was reflected, wherein the window of the vehicle is detected based on a change in a distance from a position of the laser displacement sensor in a horizontal direction to a position of the reflection point in the horizontal direction, after the vehicle in the roadway space was detected; and sending a trigger for imaging is sent to a camera, that images the vehicle, when the window of the vehicle has been detected.

The present invention also provides a recording medium that stores a program which makes a computer execute functions of:

detecting a window of a vehicle utilizing a laser displacement sensor which is provided on a shoulder of a roadway, emits a laser beam which scans a roadway space in a height direction thereof, receives a beam reflected by an object which is present in the roadway space, and measures a distance up to a reflection point on the object, at which the laser beam was reflected, wherein the window of the vehicle is detected based on a change in a distance from a position of the laser displacement sensor in a horizontal direction to a position of the reflection point in the horizontal direction, after the vehicle in the roadway space was detected; and sending a trigger for imaging is sent to a camera, that images the vehicle, when the window of the vehicle has been detected.

Effect of the Invention

As clearly understood by the above explanation, in accordance with the present invention, with reference to image data of the interior of a vehicle on a roadway, which was imaged through a glass window of the vehicle, it is possible to accurately know the state of a rear seat of the vehicle on the roadway, regardless of persons in the vehicle or loading situation of vehicle equipment or the like.

BRIEF DESCRIPTION OF THE DRAWINGS

FIG. 4 is a diagram utilized to explain the operation, for individual cases, of scanning a detection target by a laser displacement sensor 130 by means of a laser beam.

MODE FOR CARRYING OUT THE INVENTION

Below, embodiments of the vehicle imaging system, the vehicle imaging method, and the vehicle imaging device will be explained in detail with reference to the drawings.

Figure 1:
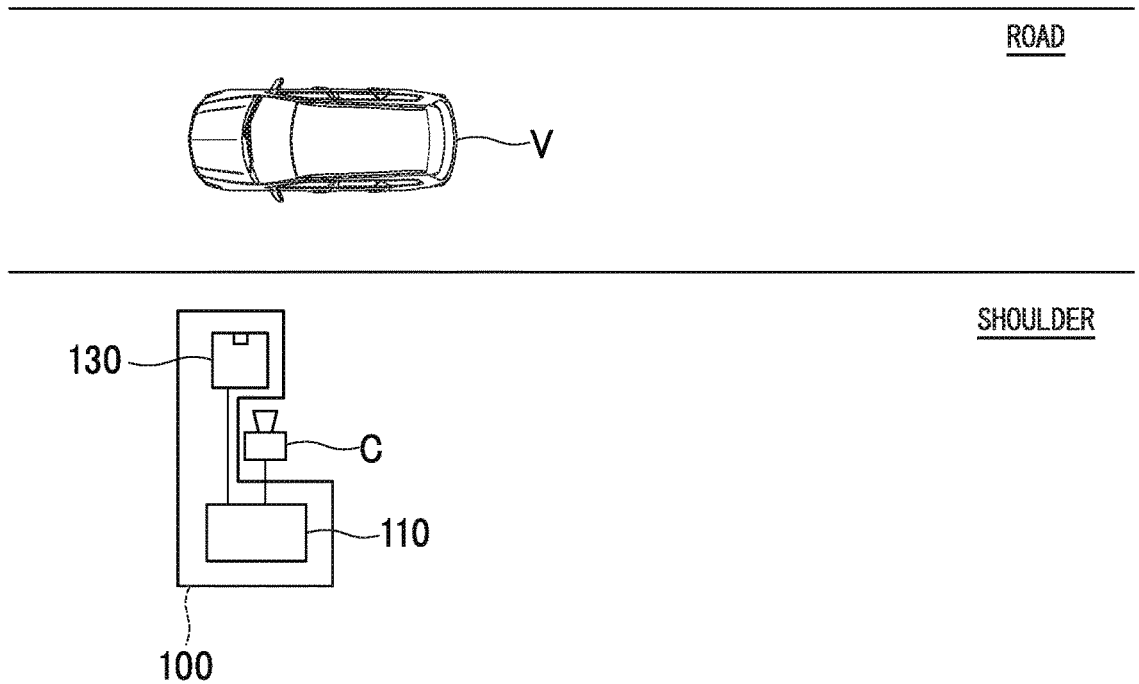
FIG. 1 is a block diagram showing the overall structure of a vehicle window detection system according to an embodiment of the present invention.

FIG. 1 is a block diagram showing the overall structure of a vehicle window detection system 100 according to an embodiment of the present invention. The vehicle window detection system 100 shown in FIG. 1 has a vehicle window detection device 110 and a laser displacement sensor 130 of a reflection type.

The laser displacement sensor 130 is displaced on a shoulder of a road and emits a laser beam from a light emitting element in a manner such that a roadway space is scanned by the laser in the vertical direction. A (laser) beam reflected by an object which is present in the roadway space is received by a light receiving element so as to measure the distance up to the reflection point on the object, at which the laser is reflected.

The vehicle window detection device 110 detects a window of each vehicle based on the distance measured by the laser displacement sensor.

The system may further include a camera C and an infrared projector (not shown).

Hereinafter, the general function of the vehicle window detection system 100 according to the present embodiment will be explained.

The vehicle window detection system 100 of the present embodiment detects the entry of a vehicle V using the laser displacement sensor 130 of the reflection type and detects the position of a glass window of the vehicle V utilizing a property of a laser beam such that the beam passes through the glass window of the vehicle V.

At the timing at which the position of the glass window of the vehicle V has been detected, a trigger for imaging is output to the camera C. Therefore, the state of the interior of the vehicle V can be reliably imaged through the glass window of the vehicle V.

Figure 2:
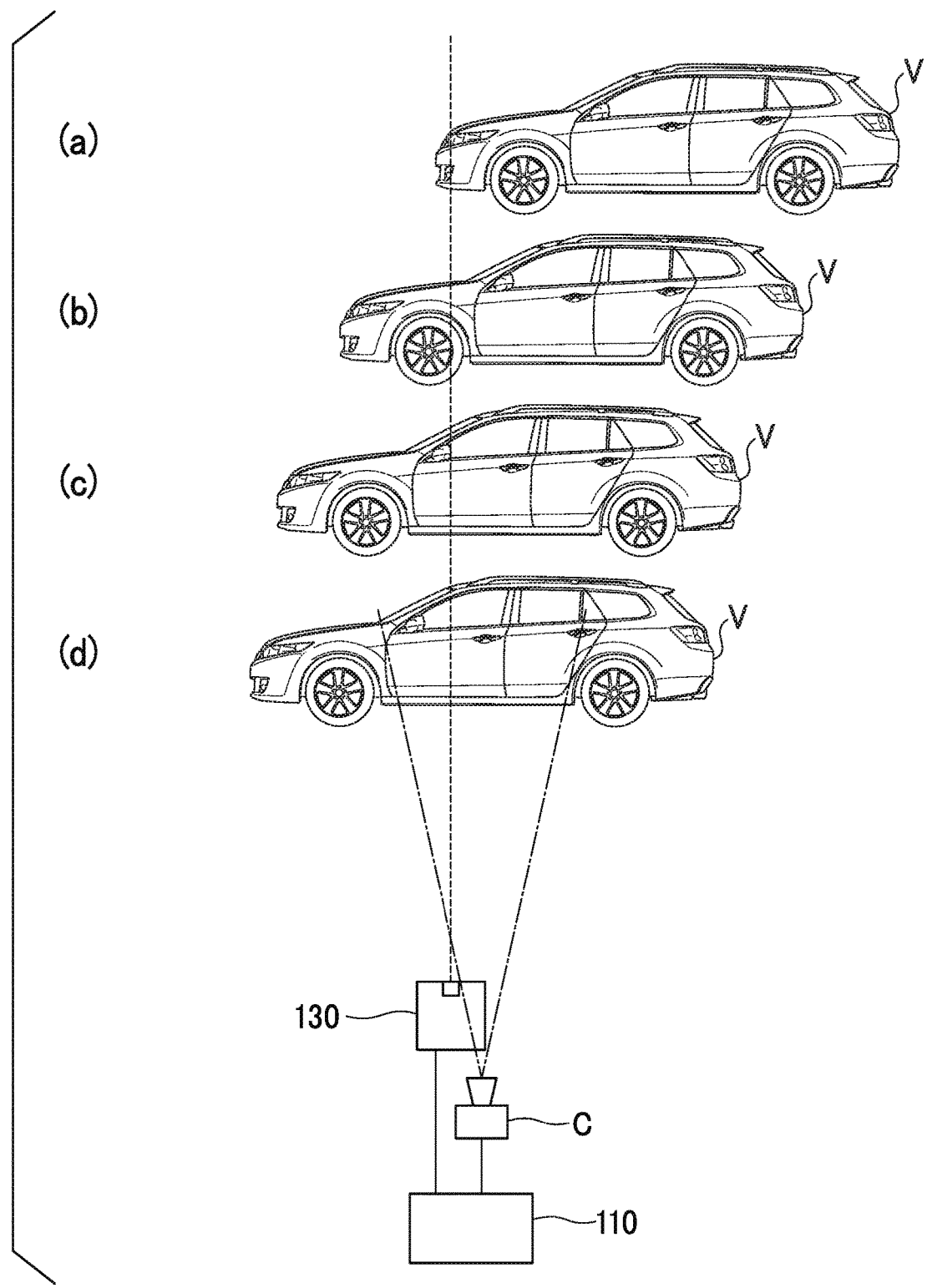
FIG. 2 is a diagram utilized to explain the imaging operation of the vehicle window detection system according to the embodiment of the present invention when a vehicle enters an imaging field.

FIG. 2 is a diagram utilized to explain the imaging operation of the vehicle window detection system 100 when a vehicle enters an imaging field. Hereinafter, with reference to FIG. 1, the imaging operation of the vehicle window detection system 100 (for the entry vehicle) will be explained utilizing FIG. 2, in accordance with the progress status as shown by steps (a) to (d).

First, in step (a), on a principle of the laser beam emitted from the laser displacement sensor 130 being reflected by an ordinary vehicle, the vehicle window detection device 110 measures the distance between the laser displacement sensor 130 and the vehicle V (in this step, the vehicle V has not yet been determined to be a vehicle).

Next, in step (b), when the measured distance becomes less than or equal to a threshold which is predetermined for the present device, the vehicle window detection device 110 determines that the vehicle V to be a vehicle.

In the next step (c), the vehicle window detection device 110 detects a candidate for a window of the vehicle V.

An employed detection method is based on a principle that when the window of the vehicle V passes in front of the laser displacement sensor 130, the distance between the laser displacement sensor 130 and the vehicle V, which is measured by means of the reflection of the laser beam emitted from the laser displacement sensor 130, has different values for the window part and the vehicle body of the vehicle V.

In the next step (d), for the detected candidate for the window of the vehicle V, the vehicle window detection device 110 verifies whether a predetermined determination condition is satisfied.

More specifically, the determination condition for the verifying process is whether or not (i) the position of the window as the candidate in the vertical direction is greater than or equal to a predetermined threshold h1 and also less than or equal to another predetermined threshold h2, and (ii) the size of the window of the vehicle V in the vertical direction is greater than or equal to a width h3.

Further, when the determination condition described above has been continued over a predetermined time t1, the vehicle window detection device 110 determines the relevant candidate window of the vehicle V to an actual window of the vehicle V.

Immediately after determining that the candidate window of the vehicle V to the window of the vehicle V, the vehicle window detection device 110 sends a trigger for the imaging to the camera C. At the same time, the vehicle window detection device 110 outputs a trigger for the light emission to the infrared projector (not shown).

Figure 3:
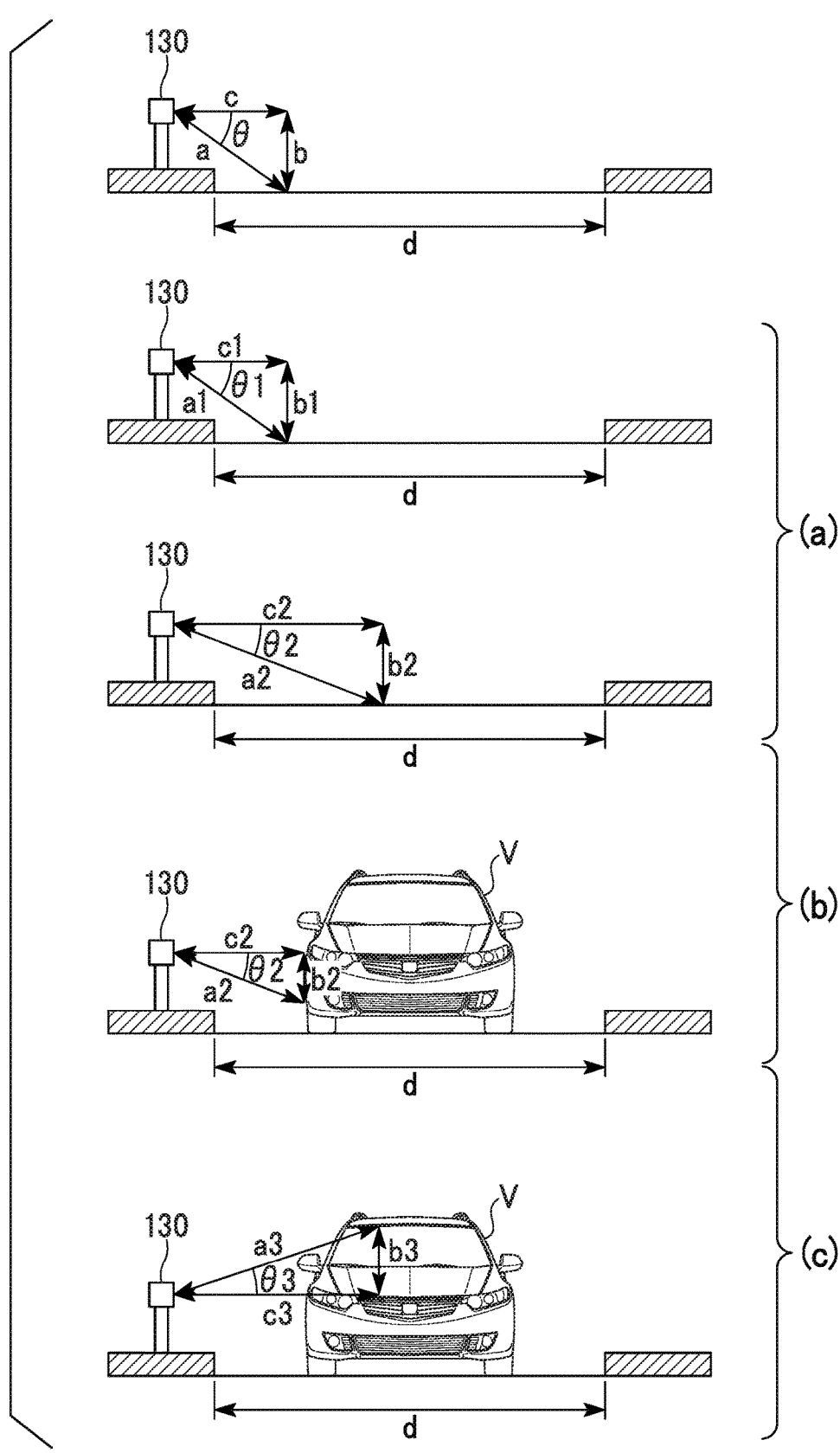
FIG. 3 is a diagram utilized to explain the vehicle detection operation of the vehicle window detection system according to the embodiment of the present invention, for individual cases.

FIG. 3 is a diagram utilized to explain the vehicle detection operation of the vehicle window detection system 100 according to the embodiment of the present invention, for individual cases. Hereinafter, with reference to FIGS. 1 and 2, the vehicle detection operation of the vehicle window detection system 100 in the present embodiment, by utilizing FIG. 3, for individual cases (as shown by (a) to (c)).

Here, in the measurement using the laser displacement sensor 130, with given "a" which is a measured value of the distance from the laser displacement sensor 130 to the vehicle body, the height up to the vehicle body viewed from the laser displacement sensor 130 (i.e., vertical distance to the vehicle body) is b (b=a×sin θ). In addition, the distance from the laser displacement sensor 130 to the vehicle body (i.e., horizontal distance to the vehicle body) is c (c=a×cos θ).

In the measurement process of each case explained below, it is assumed that a vertical distance computation unit (not shown) of the vehicle window detection device 110 computes the above-described vertical distance and a horizontal distance computation unit (not shown) of the vehicle window detection device 110 computes the above horizontal distance.

Also in the measurement process of each case, the measurement utilizing the laser displacement sensor 130 is repeated several times at regular temporal intervals.

First, in case (a) where there is no vehicle on the road, the laser displacement sensor 130 measures the reflection from the road surface, and thus "measured value b1 for the first time"="measured value b2 for the second time" (there is no change in the measured value).

Next, in case (b), when the vehicle has entered, the laser beam from the laser displacement sensor 130 is reflected by the body of the vehicle, and thus "measured value b1 for the first time">"measured value b2 after the entry". That is, the measured value of the height to the vehicle body viewed from the laser displacement sensor 130 has changed, so that the vehicle window detection device 110 determines that a vehicle has entered in this case.

If the above status has continued, the vehicle window detection device 110 determines that the vehicle is passing now and measures a measured value c3 in the horizontal direction.

Hereinafter, in case (c), when a windowpane of the vehicle passes, measured value c3>"measured value c2 (in the horizontal direction) in case (b)".

If such a status has continued, the vehicle window detection device 110 determines that a window of the vehicle has been detected and outputs a trigger for imaging to the camera C.

FIG. 4 is a diagram utilized to explain the operation (for each case) of scanning a detection target by the laser displacement sensor 130 by means of a laser beam. Hereinafter, with reference to FIGS. 1 to 3, the operation of scanning a vehicle (as the detection target) by the laser displacement sensor 130 utilizing the laser beam will be explained using FIG. 4, for the individual cases (as indicated by "(b)" and "(c)" in the figures).

In the figures, if it is assumed that the scanning period of the laser displacement sensor 130 is 20 ms and the entry speed of the vehicle is 40 km/h, then the scanning interval (i.e., length for each scan) is approximately 0.22 m.

First, in case (b) in which a portion (of the vehicle) which includes no window passes, there is no temporal change in the distance from the laser displacement sensor 130 to the vehicle body and thus a constant value is maintained substantially.

Next, in case (c) in which a portion (of the vehicle) which includes a window passes, there is a temporal change in the distance from the laser displacement sensor 130 to the vehicle body because the window portion of the vehicle passes.

In the vehicle imaging method of the present invention, in the configuration of the vehicle window detection system 100 described above, the vehicle window detection device 110 and the laser displacement sensor 130 search for each vehicle on a roadway based on results of measurement utilizing a laser beam. In addition, the vehicle window detection device 110 determines the position of a windowpane of the vehicle based on a change in the above-described measurement results during a time which has elapsed.

According to such a determination, the vehicle window detection device 110 can send the camera C an instruction to image the interior of the vehicle through the relevant glass window so that the state of the interior of the vehicle can be reliably imaged. The above measurement results include the horizontal distance and the vertical distance between the laser displacement sensor 130 and the vehicle.

Further, in the structure of the vehicle window detection system 100 described above, the vehicle imaging device of the present invention detects the position of a glass window of a vehicle on a roadway, based on a change in the horizontal distance between the laser displacement sensor 130 and the vehicle along a time which has elapsed.

Additionally, in the vehicle window detection device 110, the computer program of the present invention executes and controls the above detection method of detecting a glass window of a vehicle on a roadway, based on a change in the horizontal distance between the laser displacement sensor 130 and the vehicle along a time which has elapsed.

The recording medium of the present invention is a recording medium that stores the above computer program.

According to the vehicle window detection system 100 in the embodiment of the present invention, the interior of the vehicle can be images through the glass window at the exactly detected timing at which a glass window portion of the vehicle on the roadway is present at a position most suitable for the imaging. In addition, the device has a simple structure and can be installed easily. Therefore, the vehicle window detection system 100 according to the embodiment of the present invention can be preferably applied to monitoring of the interior of each vehicle on a road.

The vehicle window detection system 100 according to the embodiment of the present invention is also preferably applied to and can exhibit a special effect on scanning to find a vehicle used in a crime, determination about compliance status for the legal number of passengers, determination about travel regulation or traveling lane compliance with reference to the number of passengers, entry passenger management of entry vehicles, or the like.

In a system as another embodiment of the present invention, the vehicle window detection device 110 of the vehicle window detection system 100 has an additional function of determining the shape of the vehicle based on information obtained from the laser displacement sensor 130.

Priority is claimed on Japanese Patent Application No. 2012-231675, filed on Oct. 19, 2012, all contents of which are incorporated herein by reference.

INDUSTRIAL APPLICABILITY

According to the present invention, with reference to image data of the interior of a vehicle on a roadway, which was imaged through a glass window of the vehicle, it is possible to accurately know the state of a rear seat of the vehicle on the roadway, regardless of persons in the vehicle or loading situation of vehicle equipment or the like.

REFERENCE SYMBOLS

100 vehicle window detection system
110 vehicle window detection device
130 laser displacement sensor
C camera
V vehicle

The invention claimed is:

1. A vehicle imaging device that detects a window of a vehicle utilizing a laser displacement sensor which emits a laser beam which scans a side of the vehicle in a height direction of the vehicle, receives a beam reflected by the vehicle, and measures a distance from the laser displacement sensor to a reflection point on the vehicle, at which the laser beam was reflected, wherein:
the vehicle imaging device is configured to:
detect a candidate window of the vehicle based on a change in a distance from the laser displacement sensor to the reflection point;
verify whether a predetermined determination condition is satisfied for the candidate window;
when the determination condition has been continued over a predetermined time, determine the candidate window of the vehicle is a window of the vehicle, and
send a trigger for imaging to a camera when the window of the vehicle has been detected, wherein
the determination condition for the verifying process is whether or not (i) the position of the candidate window in the vertical direction is greater than or equal to a first threshold and also less than or equal to a second threshold, and (ii) the size of the candidate window in the vertical direction is greater than or equal to a predetermined width.

2. The vehicle imaging device in accordance with claim 1, wherein when the window of the vehicle has been detected, the vehicle imaging device sends a trigger for imaging an interior of the vehicle through the window to the camera.

3. The vehicle imaging device in accordance with claim 1, wherein when it is detected that the distance in the horizontal direction from the laser displacement sensor to the reflection point has increased, the vehicle imaging device determines that the window candidate of the vehicle has been detected.

4. A vehicle imaging method utilizing a laser displacement sensor which emits a laser beam which scans a side of the vehicle in a height direction of the vehicle, receives a beam reflected by the vehicle, and measures a distance from the laser displacement sensor to a reflection point on the vehicle, at which the laser beam was reflected,
the method comprising:
detecting a candidate window of the vehicle based on a change in a distance from the laser displacement sensor to the reflection point;
verifying whether a predetermined determination condition is satisfied for the candidate window;
when the determination condition has been continued over a predetermined time, determining the candidate window of the vehicle to a window of the vehicle, and
sending a trigger for imaging to a camera when the window of the vehicle has been detected, wherein
the determination condition for the verifying process is whether or not (i) the position of the candidate window in the vertical direction is greater than or equal to a first threshold and also less than or equal to a second threshold, and (ii) the size of the candidate window of the vehicle in the vertical direction is greater than or equal to a predetermined width.

5. The vehicle imaging method in accordance with claim 4, wherein when detecting the window of the vehicle, sending a trigger for imaging an interior of the vehicle through the window to the camera.

6. The vehicle imaging method in accordance with claim 4, wherein when it is detected that the distance in the horizontal direction from the laser displacement sensor to the reflection point has increased, determining that the window candidate of the vehicle has been detected.

7. A non-statutory recording medium that stores a program which makes a computer execute functions of:
detecting a window candidate of a vehicle utilizing a laser displacement sensor which emits a laser beam which scans a side of the vehicle in a height direction of the vehicle, receives a beam reflected by the vehicle, and measures a distance from the laser displacement sensor to a reflection point on the vehicle, at which the laser beam was reflected;
verifying whether a predetermined determination condition is satisfied for the candidate window;
when the determination condition has been continued over a predetermined time, determining the candidate window of the vehicle is a window of the vehicle, and
sending a trigger for imaging to a camera, that images the vehicle, when the window of the vehicle has been detected, wherein
the determination condition for the verifying process is whether or not (i) the position of the candidate window in the vertical direction is greater than or equal to a first threshold and also less than or equal to a second threshold, and (ii) the size of the candidate window in the vertical direction is greater than or equal to a predetermined width.

8. The non-statutory recording medium in accordance with claim 7, wherein when the window of the vehicle has been detected, the program causes the computer to send a trigger for imaging an interior of the vehicle through the window to the camera.

9. The non-statutory recording medium in accordance with claim 7, wherein when it is detected that the distance in the horizontal direction from the laser displacement sensor to the reflection point has increased, the program causes the computer to determine that the window candidate of the vehicle has been detected.

10. A vehicle imaging system comprising:

a camera that images a vehicle;

a laser displacement sensor which emits a laser beam which scans a roadway space in a height direction thereof, receives a beam reflected by an object which is present in the roadway space, and measures a distance up to a reflection point on the object, at which the laser beam was reflected; and a vehicle imaging device; wherein the vehicle imaging device is configured to:
  detect a candidate window of the vehicle based on a change in a distance from the laser displacement sensor to the reflection point;
  verify whether a predetermined determination condition is satisfied for the candidate window;
  when the determination condition has been continued over a predetermined time, determine the candidate window of the vehicle is a window of the vehicle, and
  send a trigger for imaging to a camera when the window of the vehicle has been detected, wherein
the determination condition for the verifying process is whether or not (i) the position of the candidate window in the vertical direction is greater than or equal to a first threshold and also less than or equal to a second threshold, and (ii) the size of the candidate window in the vertical direction is greater than or equal to a predetermined width.

* * * * *